United States Patent

Grime et al.

[11] Patent Number: 5,814,132
[45] Date of Patent: Sep. 29, 1998

[54] METHOD FOR VOC ABATEMENT AND PAINT SPRAY BOOTH INCORPORATING SUCH METHOD

[75] Inventors: Thomas E. Grime, Temperance, Mich.; Andrew P. Gargac, Oregon, Ohio; Larry E. Campbell, Louisville, Tenn.

[73] Assignee: Ransburg Corporation, Indianapolis, Ind.

[21] Appl. No.: 815,333

[22] Filed: Mar. 10, 1997

Related U.S. Application Data

[63] Continuation of Ser. No. 509,423, Jul. 31, 1995, abandoned.

[51] Int. Cl.⁶ .................................................. B01D 53/04
[52] U.S. Cl. ............................... 95/123; 95/143; 96/144; 55/DIG. 46
[58] Field of Search ........................... 95/117–123, 141, 95/143, 148; 96/135, 136, 143–145, 153; 55/DIG. 46

[56] References Cited

U.S. PATENT DOCUMENTS

| | | | |
|---|---|---|---|
| 1,382,889 | 6/1921 | Burrell et al. | 95/141 X |
| 1,418,363 | 6/1922 | Coggeshall et al. | 95/141 X |
| 2,293,901 | 8/1942 | Hutchinson | 95/23 |
| 3,395,972 | 8/1968 | Hardison | 23/4 |
| 3,713,272 | 1/1973 | Barrere, Jr. et al. | 95/143 X |
| 3,750,622 | 8/1973 | Repp et al. | 118/326 |
| 4,261,707 | 4/1981 | Bradshaw et al. | 55/48 |
| 4,265,642 | 5/1981 | Mir et al. | 55/85 |
| 4,266,504 | 5/1981 | Roesner | 118/663 |
| 4,289,505 | 9/1981 | Hardison et al. | 95/141 |
| 4,313,015 | 1/1982 | Broughton | 95/147 X |

(List continued on next page.)

FOREIGN PATENT DOCUMENTS

| | | | |
|---|---|---|---|
| 0023054 | 12/1991 | European Pat. Off. | 95/141 |
| 4319895 | 12/1994 | Germany | 95/141 |
| 56-113321 | 9/1981 | Japan | 95/141 |
| 0899097 | 1/1982 | U.S.S.R. | 95/141 |
| 1139483 | 2/1985 | U.S.S.R. | 95/123 |
| 1472084 | 4/1989 | U.S.S.R. | 95/141 |
| WO 93/03820 | 3/1993 | WIPO | 95/141 |

OTHER PUBLICATIONS

"Zeolites for VOC Abatement", Derrick Crohan, Industrial Finishing, Mar., 1993, pp. 35–37.

"Hydrophobic Zeolites for VOC Abatement", Lars Falth, Munter Zeol (undated).

"Advanced Rotor Concentrators Using Hydrophobic Zeolite", Jesper Gronvaldt, Munsters Zeol (undated).

"Sorbead Desiccants/Adsorbents", Kali–Chemie Corporation, Dec., 1988.

"A Catalytic Oxidation System For Volatile Organic Compound Abatement", Advanced Catalyst Systems (undated).

Primary Examiner—Robert Spitzer
Attorney, Agent, or Firm—MacMillan, Sobanski & Todd, LLC

[57] ABSTRACT

A VOC (volatile organic compounds) adsorbent material such as an alumino-silicate gel desiccant is treated with a masking agent to reduce its affinity for VOC's to a level that the material can be regenerated at a predetermined low temperature which will not desorb the masking agent. The treated adsorbent material is used to adsorb VOC's and is periodically regenerated with heated air. The treated adsorbent material may be used to adsorb VOC's from recirculated spray booth air while spraying a coating on a workpiece. Subsequent to spraying, the spray booth air is heated to above the VOC regeneration temperature to regenerate the adsorbent material and optionally to cure the applied coating. As the heated spray booth air is circulated through the adsorbent material, the previously adsorbed VOC's are desorbed. The desorbed VOC's may be destroyed by oxidizing, for example, with a catalyst.

19 Claims, 3 Drawing Sheets

U.S. PATENT DOCUMENTS

| | | | |
|---|---|---|---|
| 4,313,369 | 2/1982 | Tsuruta et al. | 98/115 SB |
| 4,323,372 | 4/1982 | Bentz et al. | 95/141 |
| 4,351,863 | 9/1982 | Roesner | 427/421 |
| 4,353,715 | 10/1982 | Mir et al. | 55/22 |
| 4,377,396 | 3/1983 | Krauss et al. | 95/141 |
| 4,378,235 | 3/1983 | Cosper et al. | 55/85 |
| 4,396,405 | 8/1983 | Lindenberger et al. | 55/85 |
| 4,409,006 | 10/1983 | Mattia | 95/141 X |
| 4,448,812 | 5/1984 | Lauke | 427/377 |
| 4,480,393 | 11/1984 | Flink et al. | 95/148 X |
| 4,519,816 | 5/1985 | Clarke | 55/59 |
| 4,537,120 | 8/1985 | Josefsson | 98/115.2 |
| 4,563,199 | 1/1986 | Lindenberger et al. | 55/85 |
| 4,565,553 | 1/1986 | Nowack | 55/59 |
| 4,587,927 | 5/1986 | Beierling et al. | 118/326 |
| 4,664,061 | 5/1987 | Morioka et al. | 118/663 |
| 4,687,686 | 8/1987 | Stofleth et al. | 427/421 |
| 4,750,412 | 6/1988 | Itou | 98/115.2 |
| 4,820,318 | 4/1989 | Chang et al. | 95/141 |
| 4,844,721 | 7/1989 | Cox et al. | 55/85 |
| 4,966,611 | 10/1990 | Schumacher et al. | 95/141 X |
| 4,986,836 | 1/1991 | Tandon | 55/161 |
| 5,019,138 | 5/1991 | Farrah et al. | 55/89 |
| 5,023,116 | 6/1991 | Williams et al. | 427/424 |
| 5,039,313 | 8/1991 | Gocht | 55/8 |
| 5,113,600 | 5/1992 | Telchuk | 34/90 |
| 5,114,591 | 5/1992 | Patzelt et al. | 210/663 |
| 5,127,574 | 7/1992 | Mosser et al. | 236/44 R |
| 5,133,246 | 7/1992 | Campbell | 454/52 |
| 5,133,690 | 7/1992 | Bowe | 454/51 |
| 5,137,548 | 8/1992 | Grenier et al. | 95/123 X |
| 5,163,980 | 11/1992 | Kovach | 95/141 X |
| 5,165,969 | 11/1992 | Barlett et al. | 427/421 |
| 5,198,001 | 3/1993 | Knebel et al. | 55/28 |
| 5,220,796 | 6/1993 | Kearns | 95/123 X |
| 5,221,230 | 6/1993 | Darvin et al. | 454/53 |
| 5,223,141 | 6/1993 | Brown et al. | 210/634 |
| 5,256,173 | 10/1993 | Rastelli | 95/141 |
| 5,281,257 | 1/1994 | Harris | 95/147 X |
| 5,308,457 | 5/1994 | Dalla Betta et al. | 204/131 |
| 5,346,535 | 9/1994 | Kuznicki et al. | 95/147 X |
| 5,421,860 | 6/1995 | Bretz et al. | 95/143 X |
| 5,458,784 | 10/1995 | Baker et al. | 95/141 X |

METHOD FOR VOC ABATEMENT AND PAINT SPRAY BOOTH INCORPORATING SUCH METHOD

This application is a continuation of application Ser. No. 08/509,423, filed Jul. 31, 1995, now abandoned.

TECHNICAL FIELD

The invention relates to VOC (volatile organic compounds) abatement and more particularly to an improved method for abating VOC emissions from sources such as paint spray booths and to a paint spray booth incorporating such method.

BACKGROUND ART

Governments have become increasingly concerned with and have increasingly regulated the emissions of VOC's such as organic paint and adhesive solvents and organic fabric dry cleaning solvents. Typical organic paint solvents include MEK, xylene, toluene, isopropyl alcohol and lacquer thinner. Two methods have been used in the past to abate the discharge into the atmosphere of VOC emissions from paint spray booths. According to one method, at least a portion of the air circulated through a paint spray booth is withdrawn and passed through a burner which incinerates the VOC's. Direct incineration of the VOC's can consume a large amount of energy, since the exhausted air must be heated to approximately 1500° F. to 1700° F. (815° C. to 925° C.) during the entire time that the VOC's are emitted. Further, in colder climates it may be necessary to heat a large amount of make up air which must be supplied to the spray booth to replace the exhausted air.

A second VOC abatement method involves collection of the VOC's in a filter bed, such as a charcoal filter bed. However, the filter bed either must be frequently replaced and properly disposed of or must be periodically regenerated by desorbing the accumulated VOC's. A charcoal filter bed requires about 600° F. (about 315° C.) for regeneration. When a charcoal filter bed is used for collecting VOC's, there is a risk that an exothermic reaction can occur, creating sufficient heat to cause combustion. It also is known that certain adsorbent materials such as zeolite have a high molecular affinity for VOC's and other vapors and gases, and may be used as a filter material for separating components of a gaseous mixture. A zeolite filter typically requires heating to about 300° F. to 350° F. (about 150° C. to 175° C.), or more, for regeneration. Because of the intense heat required for regeneration, it was necessary to transfer a carbon filter bed or a zeolite filter bed from the adsorption location in a spray booth to a separate furnace for regeneration. Separate heat sources were required for heating the paint in the spray booth to cure the applied paint and for regenerating the filter.

It also is known that VOC's can be eliminated from a gas stream by oxidation without reaching the combustion temperature. The VOC vapor in a gas stream can be oxidized by heating and contacting with a catalyst such as platinum. Typically, the catalyst is coated on a porous substrate, such as a ceramic honeycomb or foam, which provides a very large surface area for contact with the gas. Both catalytic oxidation and incineration are effective to reduce the emitted VOC's to carbon dioxide and water before the exhaust gas is released to the atmosphere.

Spray booths are generally used, for example, in commercial shops which repaint vehicles, in order to confine paint overspray and to evacuate VOC's released during painting. Generally, the spray booth air has been exhausted to the atmosphere. Filtered spray booth air has been recirculated back to the booth only when the booth is unmanned. Preferably, a high flow of air is passed through the spray booth filtered during painting in order to maintain clean filtered air inside the spray booth to reduce the risk of paint overspray, dust and environmental contaminants from outside the booth from contacting and damaging the wet finish. The exhausted booth air is easily filtered to remove particulate overspray. However, the highest level of VOC's are released during and immediately after the paint spraying operation. The booth air could not be recirculated during spraying in a manned booth since the painter would be subjected to an increasing VOC vapor level in the booth as painting progresses. If the spray booth air is exhausted to the atmosphere, a large quantity of clean, warm make up air is required. In colder climates, the make up air often needs to be heated. Preferably, the spray booth air is maintained at about 70° F. (21° C.) during painting and the booth temperature may be increased significantly during the drying and baking stage. For example, the painted surfaces and the booth air may be heated to reach about 140° F. to 180° F. (60° C. to 82° C.) during drying. A paint spray booth of a sufficient size for enclosing a vehicle may have an air flow rate on the order of 10,000 cubic feet per minute (283 cubic meters per minute). To exhaust this amount of air from the booth and replace it with clean, warm make up air can consume a large amount of energy in addition to the energy required for removing the VOC's from the exhausted air. This adds significantly to the cost of painting a vehicle. Ideally, any particulates such as paint overspray and the VOC's would be filtered or otherwise separated from the warm spray booth air and the warm filtered air is then returned to the booth.

DISCLOSURE OF INVENTION

The present invention is directed to a method for VOC abatement and to a paint spray booth incorporating the method. Desiccants have been used in the past for separating water vapor from gases. It has been observed that one property of desiccant is that it has a molecular attraction both for water vapor and for VOC's. For at least some desiccants such as alumino-silicate gels, the attraction for VOC's is less than the attraction for water vapor. A higher temperature is required during regeneration to drive off adsorbed water vapor than to drive off adsorbed VOC's. Another property of these desiccants is that when they are saturated with adsorbed materials, regeneration takes place over a range of temperatures. Some of the adsorbed material will be released at a lower temperature than the remainder of the adsorbed material. It has been discovered that as at least some desiccants adsorb water vapor, their VOC attraction is reduced. At the same time, the regeneration temperature required to release the molecular attraction for absorbed VOC's is reduced.

According to the invention, a VOC adsorbent desiccant or other suitable material is treated with a vapor which has a stronger molecular attraction to the adsorbent material than the adsorbent material has to the VOC's in order to lower the VOC regeneration temperature to a desired temperature. Preferably, the adsorbent material is a desiccant such as an aluminosilicate silicate gel in the form of hard generally spherical beads treated with water vapor to reduce its VOC regeneration temperature to about 140° F. to 180° F. (60° C. to 82° C.). The desiccant will require heating to a higher temperature, such as within the range of about 250° F. to 400° F. (120° C. to 205° C.) to completely eliminate the adsorbed water vapor. As a consequence of the water vapor treatment, the desiccant may lose about 80% to 90% of its VOC adsorption capability. The treated adsorbent material is used, for example, to adsorb VOC's in air which is circulated from a spray booth through the adsorbent material and is returned to the spray booth during a painting operation. All of the air withdrawn from the spray booth is filtered and passed through a VOC adsorption bed prior to returning the clean air to the spray booth. As a consequence of this process, an operator may remain in the recirculated air spray booth during spraying. This differs from the prior art recirculated air spray booths which could not be manned during spraying.

Preferably, the spray booth also is used to hold a freshly sprayed workpiece while the applied coating is cured. Curing is enhanced by heating the air circulated through the spray booth to about 140° F. to 180° F. (60° C. to 82° C.). After spraying, the operator leaves the spray booth and the booth air is heated by passing a portion of the filtered recirculated air through a burner to heat such air portion to a high temperature. At least a portion of the heated air is mixed with the remaining recirculated air and any makeup air and returned to the booth. Mixing is controlled to achieve a desired booth temperature, e.g., about 140° F. to 180° F. (60° C. to 82° C.). During the heated paint curing cycle, the heated booth air is drawn through and regenerates the filter material by causing the adsorbed VOC's to be released. The desorbed VOC's are then oxidized either through incineration or, preferably, by contacting the hot gas with a catalyst immediately downstream from the burner. The hot effluent from the catalyst is returned to the booth, as needed, to maintain the booth temperature, and the remainder is discharged to atmosphere. Filtered make up air is provided to the booth, as needed, to compensate for the catalyst effluent discharged to the atmosphere.

Accordingly, it is an object of the invention to provide a method and apparatus for removing VOC's from air.

Other objects and advantages of the invention will become apparent from the following detailed description of the invention and the accompanying drawings.

BEST MODE FOR CARRYING OUT THE INVENTION

The invention is directed to a method for the abatement of VOC's through the use of a treated adsorbent material and to the adaptation of the method to the reduction of VOC's in a paint spray booth. It is well known that certain adsorbent materials such as certain desiccants and zeolites have a strong affinity for certain vapors which render such materials useful as an adsorbent for separating such vapors from air. Desiccants such as alumino-silicate, for example, are known for adsorption of water vapor from air and other gases, while certain zeolites and charcoal are known for adsorbing VOC's from air.

Adsorbent materials may be regenerated by heating to a sufficiently high temperature to break the molecular attraction and drive off the adsorbed vapor. The actual temperature required for regeneration will depend on the strength of the molecular attraction between the adsorbent material and the adsorbed vapor. An alumino-silicate gel desiccant, for example, is commonly used as a drying agent for extracting water vapor from gas. This desiccant has a strong attraction for water vapor and may require heating to about 250° F. to 400° F. (120° C. to 205° C.) to fully desorb water vapor. It has been observed that alumino-silicate gel desiccant also will adsorb VOC's and may require heating up to about 350° F. (about 175° C.) or more to fully desorb typical VOC's released in a paint spray booth. Low boiling point hydrocarbons are desorbed at a lower temperature than higher boiling point hydrocarbons. A preferred desiccant for adsorbing VOC's is alumino-silicate gel containing about 3% alumna ($Al_2O_3$) and 97% silica ($SiO_2$) in the form of hard, generally spherical beads. Such a desiccant is commercially available, for example, from Kali-Chemie Corporation of Greenwich, Conn. under the trademark "Sorbead R". Other VOC adsorbent materials such as zeolite also may be acceptable alternatives.

Figure 1:
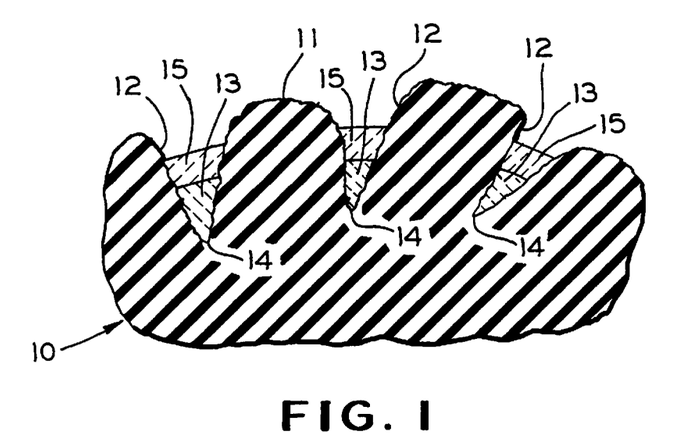
FIG. 1 is a fragmentary diagrammatic view of a portion of a filter material which has been treated with a vapor to reduce its affinity for VOC's.

Desorption takes place over a range of temperatures. The alumino-silicate gel desiccant's molecular attraction for VOC's is strong and the prior adsorption of water reduces its attraction for VOC's is strong and the prior adsorpton of water reduces its attraction for VOC's. It has been found that as water vapor is adsorbed and the desiccant becomes loaded or masked with the adsorbed water vapor, the molecular attraction for VOC's is modified and becomes weaker. When the desiccant has adsorbed as much water vapor as it will hold, it has a weak attraction for VOC's. The adsorbed VOC's are much more easily desorbed than the adsorbed water vapor. The reason for this is not yet fully understood. A possible explanation is shown in FIG. 1 which illustrates a fragmentary portion of a piece of desiccant 10. The desiccant 10 has an irregular surface 11 which contains micropores, crevasses or fissures 12. The fissures 12 and other irregularities in the surface 11 may have the strongest molecular attraction for vapors. According to the invention, the desiccant 10 is treated by exposure to a vapor such as steam to partially fill the fissures 12 or other adsorption mechanism with water or another suitable masking agent 13. The amount of water or other masking agent 13 adsorbed by the desiccant 10 will depend on the exposure to the steam. The water 13 is shown at the bottoms 14 of the fissures 12 where the molecular attraction is believed to be strongest. The desiccant 10 must be heated to the upper end of the regeneration temperature range to release this adsorbed water 13. When the desiccant 10 is subsequently exposed to air containing VOC's, it is possible that the VOC's are adsorbed as a layer 15 above the previously adsorbed water 13.

Since the water 13 fills the portions of the desiccant 10 which create the strongest molecular attraction, the attraction for the subsequently adsorbed VOC's is weakened. As more water 13 is adsorbed by the desiccant 10, the molecular attraction for the VOC's 15 becomes weaker. How ever, the trade off is that the treated desiccant 10 is less efficient in adsorbing VOC's and, for example, may be perhaps 10% to 20% as efficient at adsorbing VOC's as untreated desiccant. The actual regeneration temperature will depend on the adsorbent material and on the particular VOC's being adsorbed.

A particular paint may contain solvent having several different VOC's with different molecular attractions to the desiccant 10. If the desiccant 10 is treated so that the VOC having the strongest molecular attraction is released at 150° F. (66° C.), other adsorbed VOC's may be released at lower temperatures, for example, at only 120° F. (50° C.). Since the desiccant 10 has a stronger molecular attraction for the water 13 than for the VOC's 15, the desorption temperature range for desorbing the water 13 will be significantly higher than the desorption temperature range for the VOC's 15. Consequently, the desiccant 10 may be used to adsorb VOC's 15 and may be repeatedly regenerated and reused without affecting the adsorbed water 13. It has been noted that the steam treated alumino-silicate gel desiccant does not appear to be sensitive to moisture in the spray booth air, while the desiccant still retains an affinity for VOC's. The treatment of the desiccant with steam appears to sufficiently load the desiccant that it will not adsorb additional moisture from air at normal spray booth temperatures.

The treated desiccant 10 may be placed in filter beds through which VOC containing air is circulated to separate the VOC's from the air. In the broadest aspects of the invention, the filter bed may be used, for example, in either open front or closed paint spray booths, or for filtering VOC laden air from dry cleaning operations, manufacturing operations, etc. Depending on the application, the desiccant 10 may be regenerated either in situ or by moving the filter beds to a separate furnace (not shown) which heats the desiccant 10 sufficiently to desorb the VOC's 15 without desorbing the water or other masking agent 13.

Figure 2:
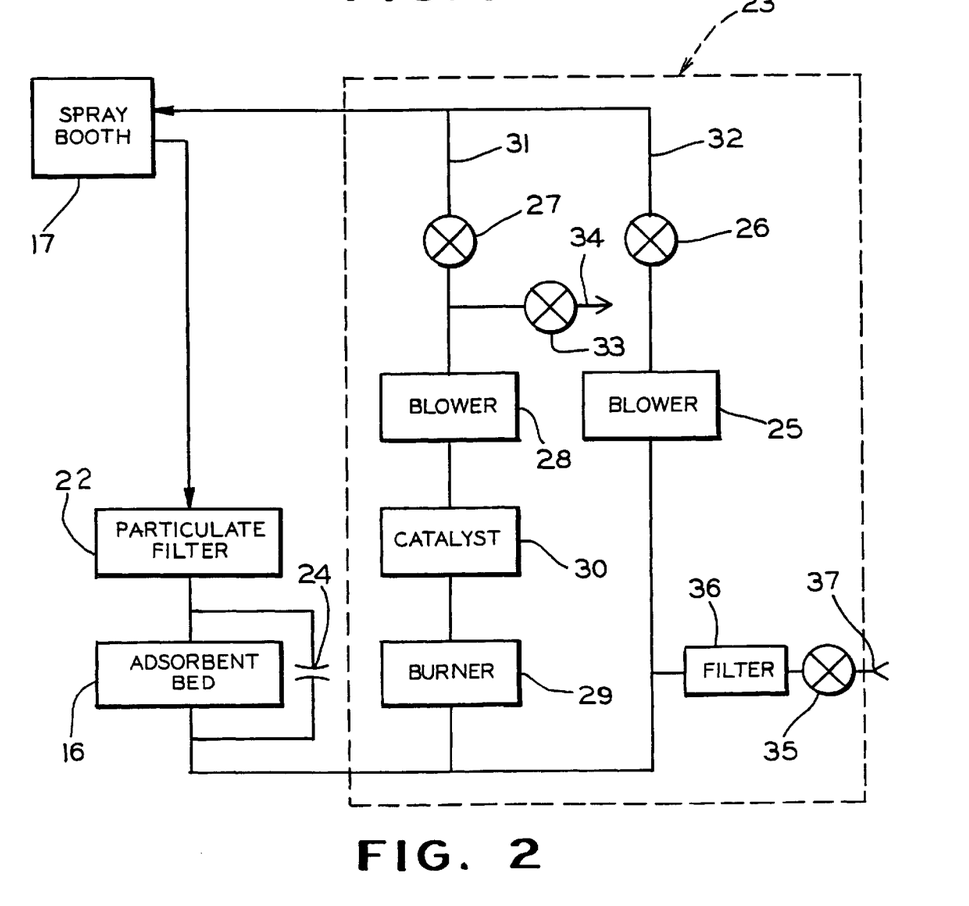
FIG. 2 is a block flow diagram for a paint spraying system according to the invention.
Figure 3:
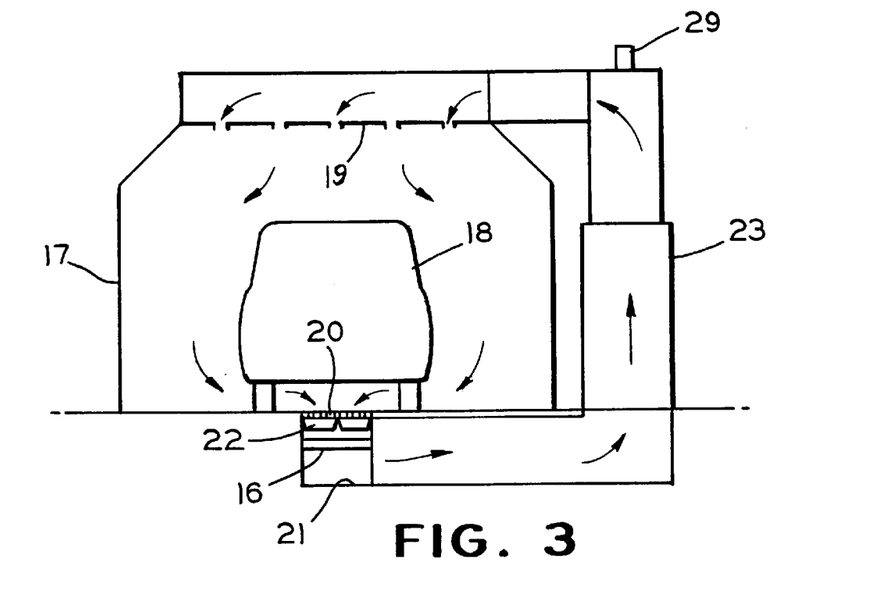
FIG. 3 is a schematic diagram of a paint spraying system according to the invention.
Figure 4:
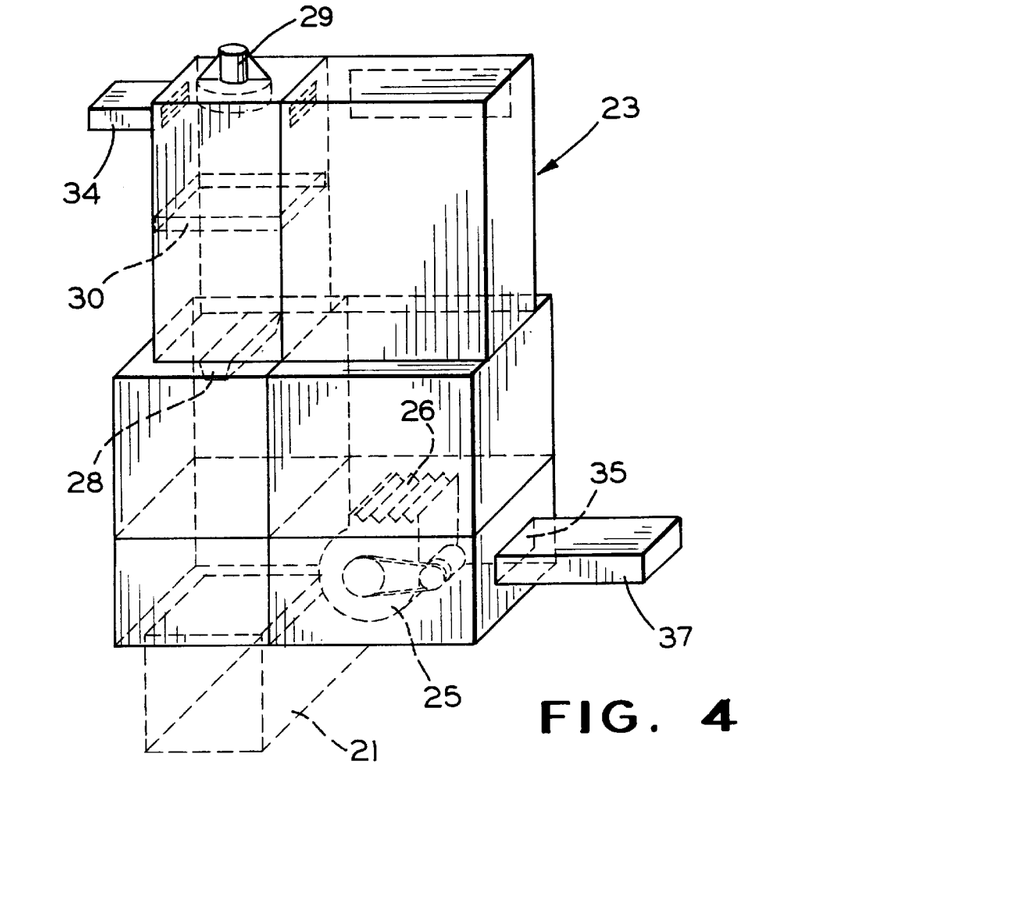
FIG. 4 is a perspective view of the air handling portion of the system of FIG. 3.

FIGS. 2–4 illustrate a treated desiccant adsorbent bed 16 located to filter VOC's from air circulated through a closed paint spray booth 17. The illustrated paint spray booth 17 is of a type suitable for use in an automobile paint refinishing operation wherein paint is sprayed on a vehicle 18 and then, while the vehicle 18 remains in the booth 17, the painted surfaces are heated to about 140° F. to 180° F. (60° C. to 82° C.) to cure the applied paint. VOC's are released into the air in the booth primarily during and immediately after the spray cycle.

FIG. 2 is a block flow diagram of a circuit for removing VOC's from the spray booth 17, which is illustrated in the schematic diagram of FIG. 3. The spray booth 17 is of the downdraft type in which a flow of air is discharged from ducts or a ceiling grid 19 at the top of the booth 17 and air with any entrained paint particles and VOC's is withdrawn through a grid 20 in the floor of the booth 17. The vehicle 18 is positioned over the floor grid 20. A pit 21 is located below the floor grid 20. The VOC adsorbent bed 16 is mounted in the pit 21 and a particle filter 22 is mounted between the adsorbent bed 16 and the grid 20. FIG. 3 represents an end view of the spray booth 17 and of the floor grid 20. The particle filter 22 and the adsorbent bed 16 may extend for substantially the full length of the spray booth 17. The spray booth air is drawn through the floor grid 20, through the particle filter 22 and through the adsorbent bed 16 by an air handling unit 23 and is returned to the spray booth 17 through the ceiling grid 19.

The minimum depth of the adsorbent beds 16 will depend on the operating cycle. As the maximum amount of VOC's which must be adsorbed between regeneration cycles increases, the volume of the beds 16 must increase. It will be appreciated that there will be a pressure drop as the booth air is drawn through the adsorbent bed 16. The adsorbent beds 16 may be a series of trays set on rails or steps (not shown) on the sides of the pit 21. One or more gaps 24 of a desired size may be established between and in parallel with the adsorbent beds 16 to control the air pressure in the spray booth 17. Since the air is recirculated through the spray booth 17, any VOC's entrained in air passing through the gaps 24 will be picked up by the adsorbent bed 16 on a subsequent cycle through the spray booth. The gaps 24 function as a coarse adjustment for reducing the back pressure across the adsorbent beds 16 and may be necessary when a single blower is used to recirculate the spray booth air.

While the vehicle 18 is being sprayed in the spray booth 17, a high capacity blower 25 in the air handling unit 23 draws the booth air through the particulate filter 22 and the adsorbent bed 16 and returns the air through a damper 26 to the spray booth 17. For a spray booth of a size to hold a vehicle 18, the blower may, for example, recirculate on the order of about 10,000 cubic feet per minute (283 cubic meters per minute) of air through the spray booth. Since the air is being filtered to remove both particulates and VOC's and is recirculated, the operation of the spray booth during spraying is energy efficient. It is not necessary to provide large quantities of heated and filtered make tip air to the spray booth 17. Air recirculation also reduces the risk of exposing the freshly painted surfaces to contaminants which could damage the finish. Since most VOC's are removed from the recirculated air, a spray gun operator with appropriate respiratory protection may be present in the spray booth during spraying.

After spraying is completed and the spray gun operator leaves the spray booth 17, a damper 27 is opened, a relatively low capacity blower 28 is turned on, and a burner 29 is turned on. The blower 28 may only have a capacity of, for example, about 1,000 cubic feet per minute (28.3 cubic meters per minute), or considerably less than the blower 25. The burner 29, a catalyst 30, the blower 28 and the damper 27 are arranged in a series flow path 31 which is connected in parallel with a flow path 32 which comprises the blower 25 and the damper 26. When the damper 27 is opened and the blower 28 is turned on, the air flow splits between the paths 31 and 32, with the majority of the recirculated air continuing to flow in the path 32. The burner 29 heats the air in the path 31 to a high temperature and the heated air is mixed with the air from the path 32 and returned to the spray booth 17. All of the heated air in the flow path 31 is initially returned to the spray booth 17 while the temperature of the spray booth is raised to the desired cure temperature. By modulating the dampers 26 and 27 after the spray booth air reaches the desired cure temperature, the air mix ratio may be controlled to maintain the temperature in the spray booth 17. Preferably, the air in the booth 17 is heated to a desired temperature on the order of between 140° F. and 180° F. (60° C. to 82° C.) to decrease the paint cure time. However, the actual desired cure temperature may vary with various factors including the properties of the applied finish and the maximum temperature to which the finished workpiece may be exposed.

The desiccant or other VOC adsorbent material in the adsorbent bed 16 is treated, as described above, to have a regeneration temperature for the VOC's at or below the temperature to which the spray booth air is heated during the cure cycle. Consequently, when the spray booth 17 is heated to the desired cure temperature, the previously adsorbed VOC's are released from the adsorbent bed 16 into the recirculated air during paint cure. However, the released VOC's are confined within the closed spray booth system and the operator is not present in the spray booth at this time due to the high temperature. Preferably, the output of the burner 29 is sufficient to heat the air in the path 31 to about 650° F. (345° C.) to activate the catalyst 30 to oxidize the VOC's flowing in the path 31. For oxidizing VOC's from paint, the catalyst may be platinum coated on a porous substrate. The substrate may be, for example, a commercially available open celled ceramic foam having on the order of about 300 cells per cubic inch (about 18.3 cells per cubic centimeter). If the burner 29 heats the air flowing in the path 31 to about 650° F. (345° C.) or more, the platinum catalyst 30 causes the VOC's to oxidize into primarily carbon dioxide and water. When heated sufficiently for activation, an exothermic reaction takes place at the catalyst 30, raising the temperature of the catalyst 30. A second damper 33 is located after the blower 28, in addition to the damper 27. The damper 33 controls the venting of gas in the flow path 31 through an exhaust duct 34 to atmosphere outside of the spray booth 17. After the spray booth 17 is heated to the desired bake temperature and while the VOC's are being oxidized by the catalyst, the damper 27 is closed and the damper 33 is opened to exhaust to atmosphere the hot air flow in the path 31 which is not needed to maintain the spray booth air temperature. As necessary, a small controlled amount of the heated air in the path 31 may be provided by modulating the damper 27 to maintain the spray booth air temperature. A make up air damper 35 and a filter 36 are connected upstream from the high capacity blower 25 to provide any needed make up air from an intake duct 37 when the exhaust damper 33 is opened during the bake or cure cycle.

It will be appreciated that only a small fraction of the recirculated spray booth air flows through the path 31. Consequently, VOC's will flow in the path 32 and the main blower 25 will return such VOC's to the spray booth. The dampers may be adjusted so that, for example, about 90% of the air withdrawn from the spray booth 17 is returned to the spray booth 17 and about 10% of the air passes through the path 31 and is exhausted to atmosphere. However, because of the high spray booth air recirculation rate, the VOC's in the spray booth will be quickly reduced to an acceptable level during the heated cure time. Since only a small portion of the air is heated and only a small amount of make up air is needed, the air handling unit 23 has a high energy efficiency. It is more economical to heat a low volume air flow to a higher temperature than to directly heat a high volume air flow to a lower temperature. Further, it is much easier to abate the VOC's in the relatively low air flow in the flow path 31 with a relatively small volume catalyst.

It should be appreciated that a single small high temperature burner serves two distinct functions. It serves to quickly heat and maintain the temperature in the spray booth 17. It also serves to heat the VOC laden air passed through the catalyst to a sufficient temperature to activate the catalyst 30. The hot air delivered to the spray booth also may serve two purposes. It may heat the painted workpiece to reduce the cure time. Also, it functions to regenerate the adsorbent bed 16 to release the adsorbed VOC's. However, it also will be appreciated that it is not necessary to cure the painted workpiece in the spray booth 17. One or more workpieces can be painted in the spray booth 17 and removed for curing elsewhere. Or, a painted vehicle can be left in the spray booth 17 overnight, for example, for curing the paint at room temperature. The temperature in the spray booth 17 may be raised for regenerating the adsorbent bed 16 while no workpiece is present in the spray booth 17.

Figure 5:
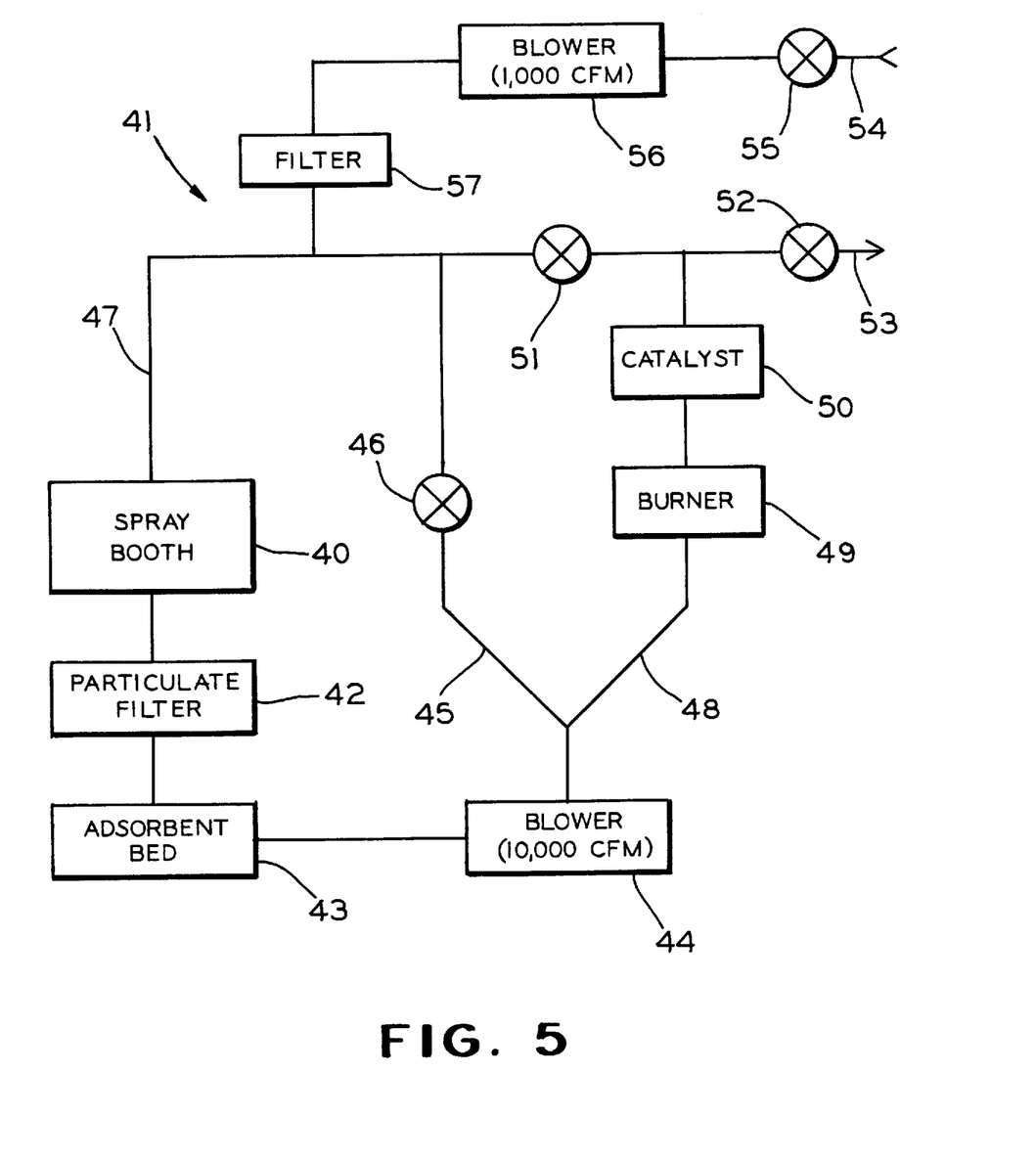
FIG. 5 is a schematic diagram of a modified paint spraying system according to the invention.

FIG. 5 shows a spray booth 40 having an air handling unit 41 according to a modified embodiment of the invention. As with the previously described embodiment, air withdrawn from the spray booth 40 is drawn through a particulate filter 42 and a VOC adsorbent bed 43 which preferably contains a treated desiccant or a similarly functioning VOC adsorbent material which has a low regeneration temperature. The air is drawn from the spray booth 40 by a high capacity blower 44 and is returned to the spray booth 40 through a flow path 45 including a damper 46 and a return air duct 47. The air discharged from the blower 44 also may flow to the return air duct 47 through a path 48 which includes a burner 49, a catalyst 50 and a damper 51. Alternately, air flow from the catalyst 50 may pass through a damper 52 to an exhaust duct 53. An intake air duct 54 is connected through a damper 55, a low capacity blower 56 and a filter 57 to supply make up air to the duct 47, as needed when air is exhausted to the duct 53.

The air handling unit 41 operates in a manner similar to the previously described air handling unit 23. During the spraying cycle, the damper 46 is opened and the dampers 51, 52 and 55 are closed. The blower 44 is operated to draw spray booth air through the particulate filter 42 and the adsorbent bed 43 to remove particulates and VOC's and the air is returned to the spray booth 40. After spraying is completed and while an operator is not present in the spray booth, the damper 51 is opened and the burner 49 is turned on to increase the air temperature in the spray booth. The dampers 46 and 51 may be modulated to provide a desired split in the air flow between the paths 45 and 48. The air flows in the paths 45 and 48 are mixed to achieve a desired temperature and are then returned to the spray booth 40 in the duct 47. Once the desired cure temperature is reached in the spray booth 40, VOC's will be quickly desorbed from the bed 43. At this time, the damper 51 is closed and the damper 52 is opened to exhaust the hot air from the catalyst 50. Once the catalyst 50 is activated by the hot air, an exothermic reaction will take place at the catalyst 50 to oxidize the VOC's. The effluent from the catalyst is vented to atmosphere through the damper 52 and the exhaust duct 53. At the same time, the damper 55 is opened and the blower 56 is operated to supply any needed make up air. The dampers 46, 51, 52 and 55 may be modulated by a programmable controller (not shown) to provide a desired temperature and air pressure balance in the system. The damper 51 may be opened to return a small portion of the hot gases from the catalyst 50 back to the spray booth 40 to maintain the spray booth cure temperature above the VOC desorbent temperature for the bed 43.

It will be appreciated that various modifications and changes may be made to the above described preferred embodiments of the invention without departing from the spirit and the scope of the following claims. For example, the specific catalyst used to oxidize the VOC's may be of any known type which will react with the particular VOC's being abated. Further, in the broadest aspects of the invention, the adsorbent material may be any VOC adsorbent material which is capable of being regenerated at the relatively low temperatures to which it may be heated in situ in the paint spray booth or in the air recirculation passages for the spray booth or other process. The VOC adsorbent material should have a VOC regeneration temperature of no greater than 250° F. (120° C.) for applications in which paint is not being cured and in any event no greater than a safe temperature for the particular application, taking into account any temperatures which will result in a risk of damage or fire. Further, in the broadest aspect of one embodiment of the spray booth, the catalyst may be eliminated and the VOC's may be oxidized by combustion, for example, with the burner 29 or the burner 49. The specified temperatures and air flow rates are intended to be exemplary and may vary with the types of VOC's being abated and with the specific application.

We claim:

1. A method for removing VOC's from a gas mixture comprising the steps of:
   a) treating VOC adsorbent material consisting of an alumino-silicate gel desiccant with a masking agent consisting of water vapor to reduce the attraction of said adsorbent material for VOC's and to reduce a regeneration temperature for desorbing VOC's from said VOC adsorbent material, said VOC adsorbent material having a stronger attraction for such masking agent than for VOC's;
   b) passing a flow of gas containing VOC vapor through the VOC adsorbent material treated with a masking agent to separate VOC's from the gas through adsorption of such VOC's in said treated VOC adsorbent material; and
   c) regenerating said treated VOC adsorbent material at a temperature sufficiently high to drive off adsorbed VOC's from said treated VOC adsorbent material while below a higher temperature required to drive off the masking agent.

2. A method for removing VOC's from a gas mixture, as set forth in claim 1, and wherein said treated VOC adsorbent material is treated with sufficient water vapor to reduce the VOC regeneration temperature of said treated VOC adsorbent material to no greater than 250° F.

3. A method for removing VOC's from air in a paint spray booth comprising the steps of:
   a) treating a VOC adsorbent material with a masking agent to reduce the attraction of said VOC adsorbent material for VOC's and to reduce a regeneration temperature for desorbing VOC's from said VOC adsorbent material, said VOC adsorbent material having a stronger attraction for such masking agent than for VOC's whereby said treated VOC adsorbent material has a masking agent regeneration temperature above a VOC regeneration temperature;
   b) circulating spray booth air through the VOC adsorbent material treated with a masking agent while a workpiece is painted in the spray booth to adsorb VOC's from such circulated spray booth air;
   c) after painting a workpiece in the spray booth, heating the spray booth air while the workpiece remains in the spray booth to cure paint applied to the workpiece; and
   d) periodically regenerating said treated VOC adsorbent material with heated spray booth air at a temperature sufficient to remove adsorbed VOC's without removing the masking agent from said treated VOC adsorbent material.

4. A method for removing VOC's from air in a paint spray booth, as set forth in claim 3, and wherein when the spray booth air is heated the spray booth air is heated to at least the VOC regeneration temperature of the VOC adsorbent material treated with a masking agent and to less than the masking agent regeneration temperature, and wherein said treated VOC adsorbent material is regenerated with the spray booth air which was heated to at least the VOC regeneration temperature.

5. A method for removing VOC's from air in a paint spray booth, as set forth in claim 4, and further including the step of oxidizing VOC's released into the heated spray booth air used to regenerate said VOC adsorbent material.

6. A method for removing VOC's from air in a paint spray booth, as set forth in claim 5, wherein said released VOC's are oxidized by heating at least a portion of the VOC containing spray booth air discharged from the adsorbent material during regeneration and contacting such heated VOC containing air with a catalyst.

7. A method for removing VOC's from air in a paint spray booth, as set forth in claim 4, and further including the step of incinerating VOC's released into the heated spray booth air used to regenerate said treated VOC adsorbent material.

8. A method for filtering VOC's from air in a paint spray booth, as set forth in claim 4 and wherein the VOC adsorbent material has a regeneration temperature no greater than 180° F. and wherein the spray booth air is heated to no greater than 180° F. to cure paint applied to the workpiece and to regenerate the VOC adsorbent material.

9. A method for removing VOC's from air in a paint spray booth, as set forth in claim 3, and wherein said adsorbent material is an alumino-silicate gel desiccant and wherein the masking agent which is used to treat said adsorbent material is water vapor.

10. A method for removing VOC's from air in a paint spray booth, as set forth in claim 3, and wherein said treated VOC adsorbent material is a desiccant, wherein said masking agent is water vapor, and wherein said desiccant is treated with sufficient water vapor to reduce its VOC regeneration temperature to no greater than 180° F.

11. A method for removing VOC's from air in a paint spray booth, as set forth in claim 3, and wherein the masking agent has a boiling point below the boiling point of some of the VOC's in the paint spray booth.

12. A method for removing VOC's from air in a spray booth comprising the steps of:
   a) while spraying a coating on a workpiece in said spray booth, circulating spray booth air through a VOC dsorbent material to separate VOC's from said circulated spray booth air by adsorption;
   b) returning the spray booth air to said spray booth after passing through said VOC adsorbent material;
   c) after completion of spraying and while continuing to circulate spray booth air through said VOC adsorbent material, heating the air circulated through said spray booth to a temperature sufficient to regenerate said VOC adsorbent material with the circulated heated spray booth air to desorb VOC's whereby VOC's adsorbed by said VOC adsorbent material are desorbed and released into heated spray booth air circulated through said VOC adsorbent material.

13. A method for removing VOC's from air in a spray booth, as set forth in claim 12, and wherein said spray booth air is heated after completion of spraying to a temperature which cures the paint sprayed on the workpiece and which also regenerates said VOC adsorbent material.

14. A method for removing VOC's from air in a spray booth, as set forth in claim 13, and wherein said circulated air is heated by heating a portion of the circulated air with a burner, mixing a controlled amount of the heated air from said burner with circulated air returned to said spray booth to establish a desired spray booth temperature and discharging any excess heated air from said burner to atmosphere, and further including the step of passing said heated air from said burner through a catalyst to oxidize the VOC's in the heated air, and wherein said burner heats such portion of the circulated air to at least an activation temperature for said catalyst.

15. A method for removing VOC's from a gas mixture comprising the steps of:
   a) treating VOC adsorbent desiccant material with a sufficient quantity of a masking agent to reduce a regeneration temperature for desorbing VOC's from the VOC adsorbent desiccant material treated with a masking agent to no greater than 250° F., said VOC adsorbent desiccant material treated with a masking agent having a stronger attraction for such masking agent than for VOC's, said masking agent reducing the attraction of said VOC adsorbent desiccant material for VOC's;

b) passing a flow of gas containing VOC vapor through the VOC adsorbent desiccant material treated with a masking agent to separate VOC's from the gas through adsorption of such VOC's in the VOC adsorbent desiccant material treated with a masking agent; and c) regenerating the VOC adsorbent desiccant material treated with a masking agent at a temperature sufficiently high to drive off adsorbed VOC's from said treated VOC adsorbent material while below a higher temperature required to drive off the masking agent.

16. A method for removing VOC's from a gas mixture, as set forth in claim 15, wherein the VOC adsorbent desiccant material treated with a masking agent is regenerated by passing a gas heated to such sufficiently high temperature through the VOC adsorbent desiccant material treated with a masking agent.

17. A method for removing VOC's from a gas mixture, as set forth in claim 15, wherein the VOC adsorbent desiccant material treated with a masking agent consisting of water vapor.

18. In combination with a spray booth for confining and collecting VOC's emitted during spraying, a filter having a VOC adsorbent material which has a VOC regeneration temperature of not greater than 250° F., a blower adapted to circulate air from said spray booth through said VOC adsorbent material for separation of VOC's from such circulated air and to return the separated air to the spray booth while spraying a workpiece, a burner adapted for heating the air in the spray booth to at least said VOC regeneration temperature of said VOC adsorbent material while paint sprayed on a workpiece is cured, such circulated spray booth air desorbing VOC's from said VOC adsorbent material when heated to said regeneration temperature, and means for oxidizing the desorbed VOC's from a portion of heated spray booth air passed through said VOC adsorbent material.

19. A spray booth, as set forth in claim 18, and wherein said means for oxidizing the desorbed VOC's from a portion of the heated spray booth air passed through said VOC adsorbent material comprises a precious metal catalyst.

* * * * *